US 6,733,600 B2

(12) United States Patent
Heishi et al.

(10) Patent No.: US 6,733,600 B2
(45) Date of Patent: May 11, 2004

(54) NITRIDED MARAGING STEEL AND METHOD OF MANUFACTURE THEREOF

(75) Inventors: Yuichi Heishi, Hamamatsu (JP); Masahiro Suzuki, Mooka (JP); Ikuo Tani, Zama (JP); Youichi Watanabe, Yokohama (JP); Shunzou Umegaki, Yokohama (JP); Kiyotaka Akimoto, Tokyo (JP); Keiji Yokose, Yokohama (JP)

(73) Assignees: Nissan Motor Co., Ltd., Yokohama (JP); Dowa Mining Co., Ltd., Tokyo (JP)

( * ) Notice: Subject to any disclaimer, the term of this patent is extended or adjusted under 35 U.S.C. 154(b) by 0 days.

(21) Appl. No.: 09/907,455

(22) Filed: Jul. 18, 2001

(65) Prior Publication Data
US 2002/0014281 A1 Feb. 7, 2002

(30) Foreign Application Priority Data

Jul. 24, 2000 (JP) .................. 2000-222209
Dec. 6, 2000 (JP) .................. 2000-371107

(51) Int. Cl.⁷ .................. C23C 8/26; C23C 8/02
(52) U.S. Cl. .................. 148/230; 148/283
(58) Field of Search .................. 148/230, 283, 148/318

(56) References Cited

U.S. PATENT DOCUMENTS

| | | | | |
|---|---|---|---|---|
| 4,698,050 A | | 10/1987 | Hattori et al. | 474/242 |
| 4,969,378 A | | 11/1990 | Lu et al. | 76/108.2 |
| 5,112,030 A | * | 5/1992 | Tahara et al. | 266/256 |
| 5,393,488 A | * | 2/1995 | Rhoads et al. | 148/335 |
| 5,953,969 A | | 9/1999 | Rosenhan | 81/436 |
| 6,309,474 B1 | * | 10/2001 | Yagasaki | 148/230 |
| 6,318,140 B1 | * | 11/2001 | Yamagishi et al. | 72/110 |

| | | | | |
|---|---|---|---|---|
| 2001/0006081 A1 | * | 7/2001 | Uehara et al. | 148/318 |

FOREIGN PATENT DOCUMENTS

| | | | | |
|---|---|---|---|---|
| JP | 59-80772 | | 5/1984 | |
| JP | 02-154834 A | * | 6/1990 | C23C/8/26 |
| JP | 11-229113 | | 8/1999 | |
| JP | 11-229113 A | * | 8/1999 | C23C/8/32 |

OTHER PUBLICATIONS

Machine translation of JP 11–229113 A.*
Patent Abstracts of Japan 10(67) C–333, Mar. 15, 1986 & JP 60 204825 A (Mitsubishi Jukogyo KK), Oct. 16, 1985 (Abstract).
Patent Abstracts of Japan 10(345) C–386, Nov. 20, 1986 & JP 61 147814 A (Kobe Steel Ltd.), Jul. 5, 1986 (Abstract).
Patent Abstracts of Japan 8(195) M–323, Sep. 7, 1984 & JP 59 085711 A (Purasu Engineering KK), May 17, 1984 (Abstract).
Patent Abstracts of Japan 9(119) C–282, May 23, 1985 & JP 60 009857 A (Purasu Engineering KK) Jan. 18, 1985 (Abstract).

(List continued on next page.)

Primary Examiner—Roy King
Assistant Examiner—Harry D. Wilkins, III
(74) Attorney, Agent, or Firm—Foley & Lardner LLP

(57) ABSTRACT

A maraging steel is subjected to the aging to have a hardness of more than 500 Hv. A nitrided case is formed to have a depth that is about 20% to 50% to a ½ thickness of the maraging steel plate. An endless ring for a metal belt is constructed by the above maraging steel. According to methods of manufacturing the maraging steel and the endless ring, the nitrided case having the depth that is 20% to 50% of a distance from a plate surface to a center can be formed by executing an aging to have the hardness of more than 500 Hv, then executing a nitriding in the nitrogen atmosphere to which organic chloride is added.

14 Claims, 10 Drawing Sheets

OTHER PUBLICATIONS

Patent Abstracts of Japan 12(92) C–483, Mar. 25, 1988 & JP 62 224665 A (Toyota Central Res. & Dev. Lab. Inc.) Oct. 2, 1987 (Abstract).

Patent Abstracts of Japan 12(47) C–475, Feb. 12, 1988 & JP 62 192528 A (Toyota Central Res. & Dev. Lab. Inc.), Aug. 24, 1987 (Abstract).

Database WPI, Section Ch, Week 198619 Derwent Publications Ltd., London, GB; Class M13 An 1986–121993 XP00218223 & JP 61 060874 A (Oyo Kagaku Kenkyush), Mar. 28, 1986 (Abstract).

* cited by examiner

FIG.5

| | Heating profile | Hardness after aging (Hv) | Nitriding temperature (°C) | Nitriding time (min) | Residual compressive stress (MPa) | Surface hardness (Hv) | Internal hardness (Hv) | Concentration of nitrogen in surface (%) | Nitrided case depth/ half thickness of plate (%) | Fatigue life (×1000 number of times to failure) |
|---|---|---|---|---|---|---|---|---|---|---|
| Example 1 | a+b | 560 | 450 | 15 | 671 | 752 | 575 | 0.6 | 26 | 51~940 |
| Example 2 | a+b | 560 | 450 | 30 | 818 | 784 | 578 | 0.8 | 31 | 73~200 |
| Example 3 | a+b | 560 | 450 | 45 | 942 | 815 | 575 | 0.93 | 35 | 76~700 |
| Example 4 | a+b | 560 | 450 | 60 | 1091 | 849 | 580 | 1.33 | 39 | 75~540 |
| Comparative example 1 | a+b | 560 | 450 | 8 | 557 | 741 | 565 | 0.4 | 19 | 3.0~66 |
| Comparative example 2 | a+b | 560 | 450 | 75 | 878 | 860 | 569 | 1.4 | 52 | 4.2~200 |
| Comparative example 3 | a+b | 478 | 450 | 45 | 1020 | 830 | 565 | 0.98 | 34 | 1.9~5.3 |
| Comparative example 4 | c | — | 420 | 90 | 904 | 946 | 580 | 0.5 | 38 | 1.7~5.0 |
| Comparative example 5 | a | 560 | Without nitriding | | 150 | — | 560 | 0 | 0 | 1.4~1.7 |

NITRIDED MARAGING STEEL AND METHOD OF MANUFACTURE THEREOF

BACKGROUND OF THE INVENTION

1. Field of the Invention

The present invention relates to nitrided maraging steel which can be used as a metal belt in a belt-type variable speed drive for the car, etc., for example, and a method of manufacturing the same.

2. Description of the Related Art

The metal belt employed in the belt-type variable speed drive has a structure as shown in FIG. 1. For example, about 400 pieces of metal blocks 10 are coupled in an endless fashion by two sets of metal endless rings 20 each of which is constructed by laminating the endless rings up to about nine layers. The endless rings 20 need the high tensile strength that is required for the power transmission and the fatigue life that withstand the repeat bending stress caused when the belt is wound on the pulley. For this reason, the maraging steel that is known as the ultra high strength steel is employed as the endless rings 20. In addition, the nitriding is applied to this maraging steel to improve the fatigue life.

However, the passive oxide film due to the oxidation is formed on the surface of the steel that contains a number of alloy elements, like the maraging steel. Therefore, the permeation of the nitrogen is prevented by the passive film and thus the uniform nitriding become difficult.

Up to now, as the nitriding method for the maraging steel, there have been proposed the method of executing the nitriding after the oxide film is removed by using the hydrogen chloride or the phosphoric acid, the method of executing the nitriding in the nitriding atmosphere to which the hydrogen sulfide is added, the method of executing the nitriding after the oxide film on the surface is reduced by using the fluorine compound, the method of executing the nitriding in the salt bath, etc. so as to improve the fatigue life.

However, the problem such as the stability in quality, the workability, the economical efficiency, the measure for the environmental pollution, or the like still remains in the above nitriding methods. For example, the method of removing the passive oxide film by using the hydrogen chloride or the phosphoric acid fails to provide a sufficiently uniform nitrided case. Also, since the method of executing the sulphonitriding in the nitriding atmosphere, to which the hydrogen sulfide is added, employs the hydrogen sulfide having the strong toxicity, the heavy burden in the handling and management of the chemicals is imposed. Further, the method of executing the nitriding after reducing the oxide film on the surface by using the fluorine compound needs the high process cost, because the nitriding must be executed after the fluoriding treatment. In addition, the fluorine compound remains on the surface of the maraging steel. Also, since the method of executing the nitriding in the salt bath employs the cyanogens, the measure for the environmental pollution such as the waste water process is needed and thus there is the problem in the workability.

Further, since the endless ring for the metal belt that is constructed by laminating about ten sheets of rings, as shown in FIG. 1, is used, variation in the elongation of the circumferential length of the rings caused before and after the nitriding must be reduced. Therefore, it may be considered that, like the nitriding method disclosed in Japanese Patent Application Publication Sho 59-80772 (published in 1984), the nitrided depth must be formed shallow by lowering the ammonia concentration upon the gas nitriding to reduce the permeation of the nitrogen.

SUMMARY OF THE INVENTION

However, in recent years, the needs for the higher output of the engine and the reduction in size and weight are enhanced. Thus, the higher strength of the metal belt is desired in order to satisfy such request. Accordingly, in order to achieve the higher strength of the maraging steel, it is requested to form the uniform and deeper nitrided case by improving much more the nitriding in the prior art.

Also, since the maraging steel is the precipitation hardening alloy steel, the age hardening makes progress simultaneously with the nitriding to change the mechanical characteristics. For this reason, the selection of the nitriding treating profiles to sufficiently bring out the characteristics of the maraging steel, that is neither insufficiently aged nor excessively aged, must be checked.

It is an object of the present invention to provide a maraging steel that is excellent in fatigue life and has a small amount of variation in the length based on the nitriding, and an endless ring for a metal belt in a variable speed drive using the same.

It is another object of the present invention to improve the stability in quality, the workability, the economical efficiency, etc. in the nitriding of the maraging steel, and also to prolong the fatigue life by improving the fatigue life.

A first aspect of the present invention provides a maraging steel which comprises a plate which is subjected to an aging to have a hardness of more than 500 Hv; and a nitrided case formed on a surface layer of the plate. The nitrided case has a depth that is about 20% to 50% to a ½ thickness of the plate.

A second aspect of the present invention provides an endless ring applied to a metal belt. This endless ring comprises a maraging steel plate which is subjected to an aging to have a hardness of more than 500 Hv; and a nitrided case formed on a surface layer of the plate. This nitrided case has a depth that is about 20% to 50% to a ½ thickness of the plate.

A third aspect of the present invention provides a method of manufacturing the above maraging steel plate. This method comprises executing an aging to have a hardness of more than 500 Hv; and forming a nitrided case whose depth is about 20% to 50% to a distance from a plate surface to a center. This nitrided case is formed by executing a nitriding in a nitrogen atmosphere, to which organic chloride is added, after the aging.

A forth aspect of the present invention provides a method of manufacturing the above endless ring applied to the metal belt. This method comprises executing an aging to have a hardness of more than 500 Hv; and forming a nitrided case whose depth is about 20% to 50% to a distance from a plate surface to a center. The nitrided case is formed by executing a nitriding in a nitrogen atmosphere, to which organic chloride is added, after the aging.

BRIEF DESCRIPTION OF THE DRAWINGS

FIG. 5 is a table showing evaluated results of mechanical characteristics of examples and comparative examples;

DETAILED DESCRIPTION OF THE EMBODIMENTS

Embodiments of the present invention will be explained with reference to the accompanying drawings hereinafter.

A maraging steel used in an embodiment of the present invention consists mainly of a 18% Ni-based maraging steel, and contains respective chemical components of C of less than or equal to 0.03%, Si of less than or equal to 0.1%, Mn of less than or equal to 0.1%, Ni of 17 to 19%, Mo of 3 to 5.5%, Co of 7 to 9.5%, Al of 0.05 to 0.2%, and Ti of 0.15 to 0.8% in mass ratio.

In order to enable the maraging steel in the present embodiment to be used as an endless ring for the metal belt of the variable speed drive, the aging and the solution treatment are applied to the maraging steel material.

Figure 1:
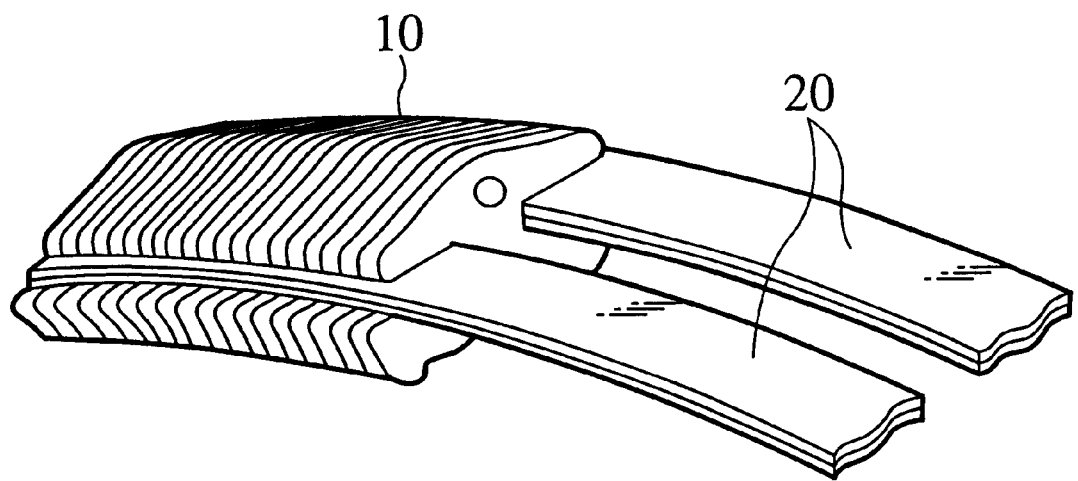
FIG. 1 is a partial perspective view showing a metal belt for a variable speed drive employing endless rings.
Figure 2:
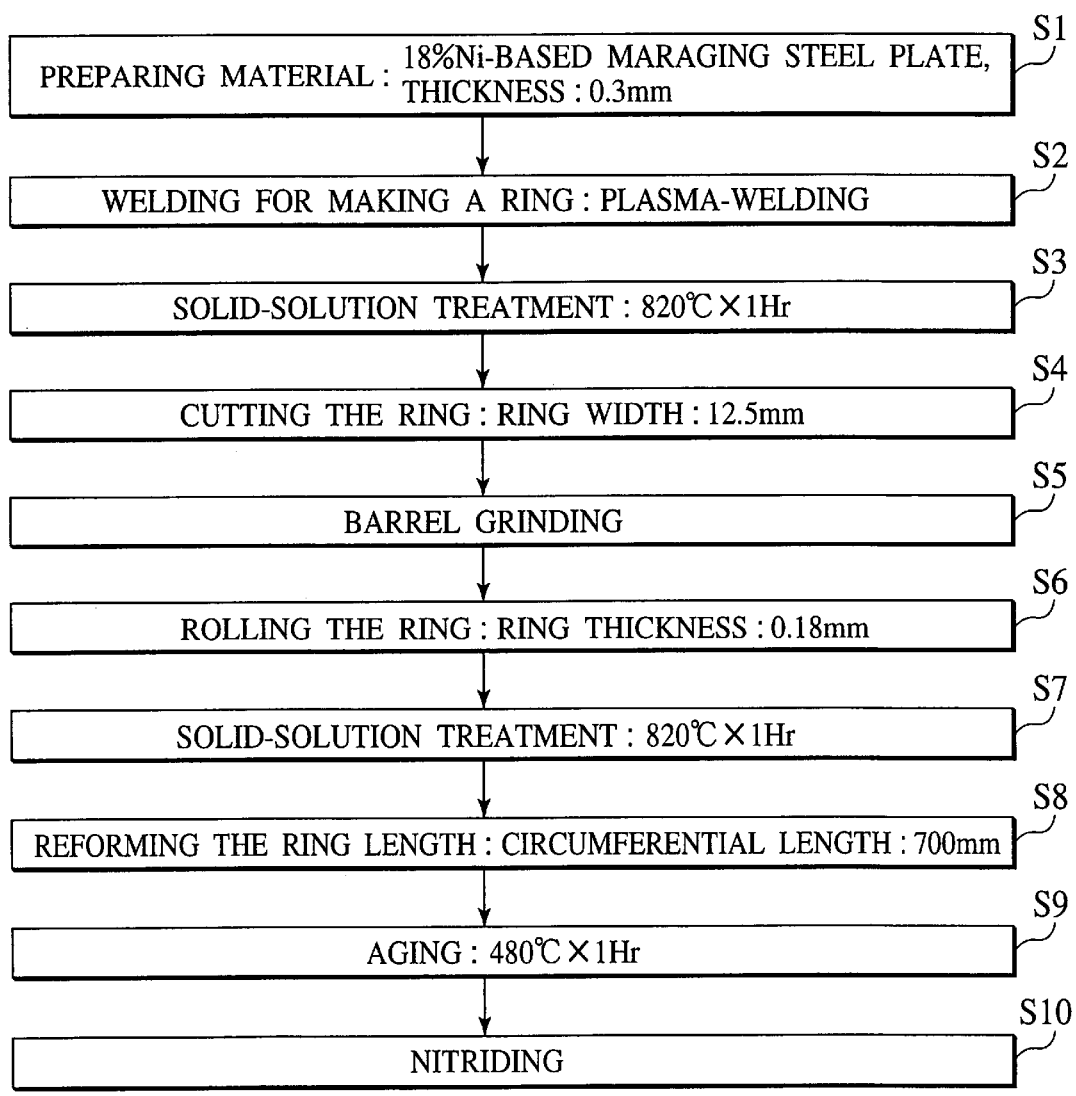
FIG. 2 is a flowchart showing an example of the endless ring manufacturing steps.

More particularly, in order to manufacture the endless ring for the metal belt of the variable speed drive from the maraging steel material, respective processes shown in FIG. 2 are employed, for example.

First the 18% Ni-based maraging steel material that is rolled to have a plate thickness of about 0.1 to 0.3 mm is prepared (S1). Next, the maraging steel plate is welded into a ring shape by laser beam welding or the plasma beam welding (S2). The solution treatment is applied to the ring-like maraging steel at about 800 to 850° C., preferably 820° C. for 1 hour (S3). Then, a plurality of ring-like maraging steels each having a plate width of about 12.5 mm are obtained by cutting the ring-like maraging steel (S4). Then, cut edges of each ring-like maraging steel is made smooth by the barrel grinding (S5). Then, the ring whose plate thickness is about 0.18 mm and whose circumferential length is about 700 mm is obtained by rolling the ring-like maraging steel (S6). Then, the solution treatment is applied again to the ring by heating it up to about 800 to 850° C., preferably 820° C. for 1 hour(S7). Thus, the dimension reformation of the ring is carried out (S8). Then, the aging is carried out by heating the ring up to about 480 to 510° C. (S9). Then, the nitriding is applied to the ring at about 450° C. for about 10 to 60 minutes (S10).

In the present embodiment, the aging is applied to the maraging steel prior to the nitriding. In this case, it is desirable that conditions of this aging should be set such that the processed maraging steel has the hardness of more than 500 Hv. This is because, if the nitriding is applied in the situation that the hardness of the maraging steel that is subjected to the aging is below 500 Hv, i.e., the aging does not sufficiently make progress, the nitrided case becomes fragile and thus the sufficient aging strength cannot be achieved.

Also, it is desirable that the nitriding should be carried out after the aging and the nitrided case having an about 20% to 50% depth in contrast to the ½ thickness of the maraging steel should be formed. An average surface nitrogen concentration of this nitrided case should be set to more than or equal to 0.5 wt %. If the nitrided case depth is adjusted in the above range, the good fatigue life can be achieved. Also, the surface nitrogen concentration of the nitrided case is below 0.5 wt %, the surface hardness and the residual compressive stress required to get the sufficient fatigue life cannot be obtained.

Further, it is preferable that the conditions to give the residual compressive stress value of the maraging steel in 600 Mpa or more after the nitriding should be set. This is because, if the residual compressive stress value of the maraging steel becomes below 600 Mpa after the nitriding, the sufficient fatigue life cannot be obtained.

In order to manufacture the maraging steel having the above-mentioned characteristics, it is desired that nitriding treating profiles carried out after the aging should be set to conditions described in the following.

The nitriding employs the gas nitriding using the ammonia gas ($NH_3$) or the gas soft-nitriding using the ammonia gas and the diluent gas. That is, the $NH_3$ gas, the $NH_3$ gas+$N_2$ gas, the $NH_3$ gas+endothermic gas, or the like is employed as the atmospheric gas. In this case, the control of the nitrogen concentration can be relatively easily performed. If the gas soft-nitriding is executed, this treatment can be carried out at the relatively low temperature and therefore generation of the strain can be suppressed.

Also, it is preferable that the organic chloride should be added to this atmospheric gas. The added organic chloride is vaporized in the furnace and decomposed into the hydrogen chloride and the carbon. The hydrogen chloride generated by the decomposition removes the passive oxide film on the processed object, i.e., the maraging steel to activate the surface of the maraging steel. The $NH_3$ gas in the atmosphere is adsorbed on the surface of the activated maraging steel to accelerate the nitriding reaction. Thus, the deeper nitrided case having the higher hardness can be obtained. Since the nitriding proceeds uniformly in the depth direction because of the passive oxide film removing effect, it is possible to control the nitrided case depth precisely.

As the organic chloride added to the nitriding atmosphere, methylene chloride may be employed, for example. This methylene chloride has the small viscosity and decomposed easily, and is excellent in the handling property and the safety. In addition, vinylidene chloride may be employed as the organic chloride. In this case, in using these materials, the hydrogen chloride gas is generated by the decomposition of the gas in the furnace in which the nitriding is carried out. However, since an amount of the hydrogen chloride gas is minute and this hydrogen chloride gas hardly remains after the nitriding, there is little problem to handle such organic chloride.

It is preferable that an amount of methylene chloride added to the nitrogen atmosphere should be set to 30 to 100 ml per the furnace volume 1 m³. If the addition amount of methylene chloride is below 30 ml per the furnace volume 1 m³, the activation of the maraging steel is not sufficiently performed and thus the lack of the uniform nitriding or the omission of the nitriding is caused. In contrast, if the addition amount of methylene chloride exceeds 100 ml per the furnace volume 1 m³, the free carbons increase in the atmosphere and the accumulation of the soot on the surfaces of the maraging steel and the furnace increase too.

The treating temperature of the nitriding is set to less than the aging precipitation temperature of the maraging steel, i.e., the temperature that is lower than at least the temperature of the aging carried out before the nitriding, for example, 400° C. to 500° C., preferably 450° C. to 500° C. In the case of 400° C. to 500° C., this treatment temperature is held for 15 minutes to 3 hours. In the case of 450° C. to 500° C., this treatment temperature is held for 15 to 60 minutes. According to the nitriding treating profiles, it is possible to form the nitrided case whose depth is about 20% to 50% to a ½ plate thickness of the maraging steel. If the nitriding is carried out for the time longer than the above, the fragile white iron-nitrogen compound is formed on the surface of the maraging steel, and thus such longer nitriding is not preferable.

Examples and results of the present invention will be explained hereinafter.

EXAMPLES

Figure 3A:
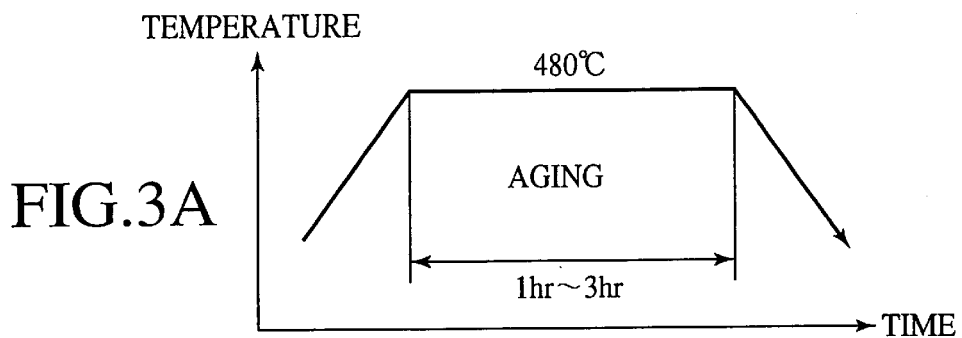
FIG. 3A is a view showing an example of a heating profile in an aging of a maraging steel.
Figure 3B:
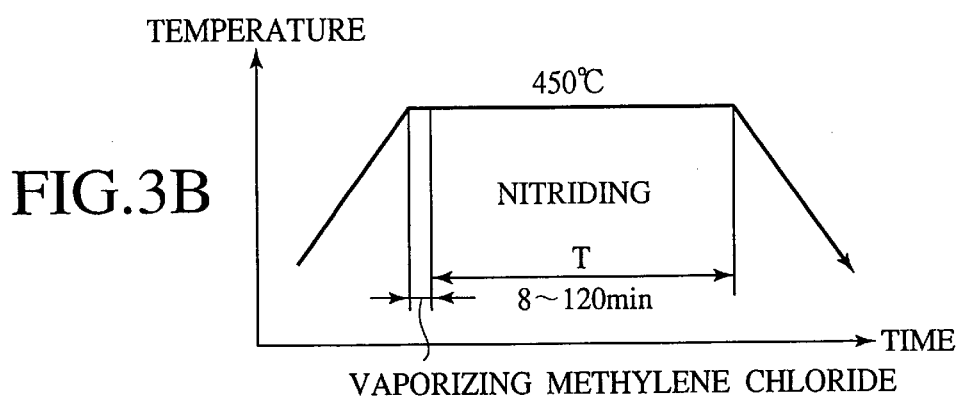
FIG. 3B is a view showing an example of a heating profile in a nitriding of the maraging steel.

The endless ring whose plate thickness is 0.18 mm, whose width is 12.5 mm, and whose circumferential length is 700 mm was fabricated by applying the plasma welding, the solution treatment, and the rolling process to the 18% Ni-based maraging steel having the plate thickness of 0.3 mm, in compliance with the procedures shown in FIG. 2. More particularly, the solution treatment was applied to the maraging steel at 800° C. to 900° C., then the aging was carried out under the heating profile (480° C. is held for 1 hour to 3 hours) shown in FIG. 3A, and then the nitriding was carried out under the heating profile (450° C. is held for 15 minutes to 120 minutes) shown in FIG. 3B. In this case, the solution treatment and the aging were carried out in vacuum (about $1.33 \times 10^{-1}$ Pa≈$10^{-3}$ Torr) so as to prevent the oxidation of the surface of the maraging steel.

The nitriding was carried out in the mixed gas atmosphere that consists of $NH_3$ gas 40%+$N_2$ gas 60%. After the maraging steel was loaded into the nitriding furnace, the methylene chloride of the organic chloride was added as the oxide film removing agent into the furnace at a rate of 90 ml per the furnace volume 1 m³ at the same time when the furnace temperature was restored to 450° C. The temperature of 450° C. was held for 15 to 60 minutes, and then the maraging steel is moved into the cooling chamber to cool in the $N_2$ gas atmosphere. In this manner, four types of endless rings made of the maraging steel, that are subjected to the nitriding for different times, were fabricated.

Examples 1 to 4

Figure 4:
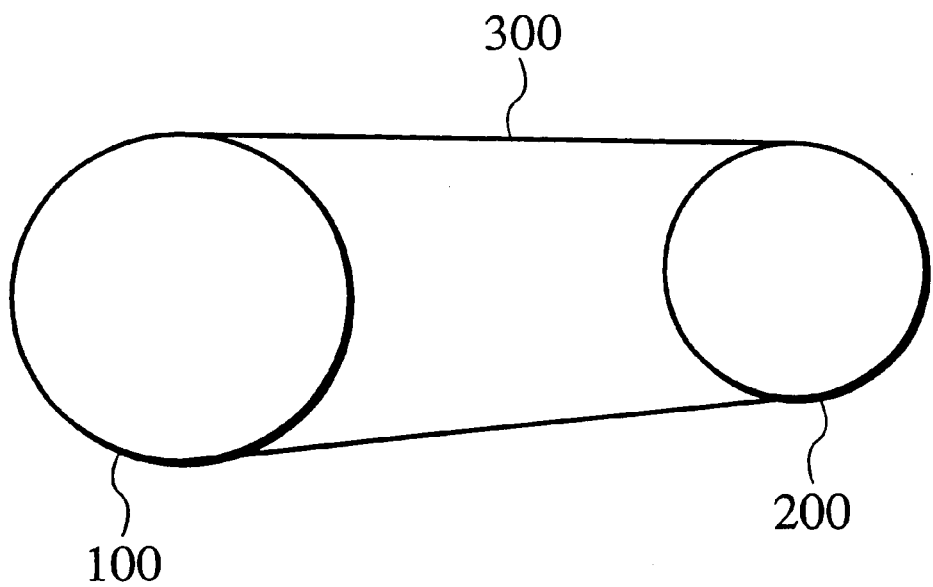
FIG. 4 is a view showing a belt-pulley type endless ring fatigue tester.

The hardness of the endless ring after the aging, and the residual compressive stress, the surface hardness, the internal hardness, the surface nitrogen concentration, and the nitrided depth after the nitriding were measured respectively. In the fatigue life of the endless ring, the tensile strength, the bending strength, and the bending-returning strength were measured by using the belt-pulley type fatigue tester shown in FIG. 4. As shown in FIG. 4, this tester has a driving pulley 100 having a 160 mm diameter and a driven pulley 200 having a 80 mm diameter, and then a belt 300 as the endless ring is stretched between the driving pulley 100 and the driven pulley 200. Then, the tensile load applied to the belt 300 was adjusted to 4,903 N (=500 kgf) and the driving pulley 100 was rotated at 1,000 rpm, and then the number of revolution until the belts come up to the fatigue fracture was evaluated. The evaluated results of these mechanical characteristics are shown in Table of FIG. 5.

Comparative Examples I

In Comparative Examples I, five types of maraging steel endless rings (Comparative Example 1 to Comparative Example 5) described in the following were fabricated.

For the maraging steel endless ring in Comparative Example 1, the nitriding time was set short like 8 minutes and remaining conditions were set to the same conditions as Examples.

For the maraging steel endless ring in Comparative Example 2, conversely the nitriding time was set long like 75 minutes and remaining heating profiles were set to the same conditions as Examples.

For the maraging steel endless ring in Comparative Example 3, the aging executed before the nitriding was carried out short to get the hardness of below 500 Hv after the aging, and remaining conditions were set to the same heating profiles as Example 3.

Figure 3C:
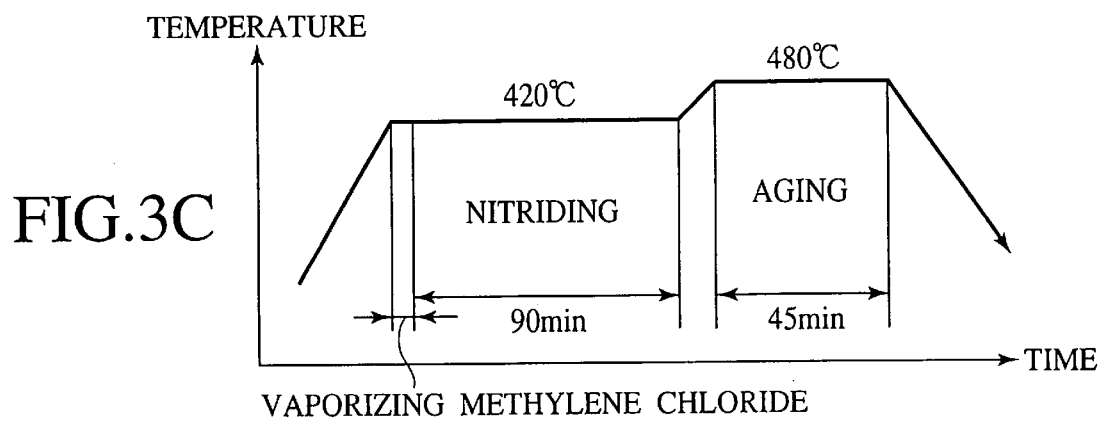
FIG. 3C is a view showing an example of a heating profile used when both the aging and the nitriding of the maraging steel are carried out simultaneously.

For the maraging steel endless ring in Comparative Example 4, the aging was carried out simultaneously with the nitriding, i.e., the aging was carried out while executing the nitriding, according to the heating profile shown in FIG. 3C. Remaining conditions were set to the same treating profiles as Examples.

For the maraging steel endless ring in Comparative Example 5, no nitriding was executed. Remaining conditions were set to the same treating profiles as Examples.

As with the maraging steel in Comparative Examples 1 to 5, the hardness of the endless ring after the aging, and the residual compressive stress, the surface hardness, the internal hardness, the surface nitrogen concentration, and the nitrided depth after the nitriding, and the fatigue life were measured respectively, like Examples. The evaluated results of these mechanical characteristics are also shown in Table of FIG. 5.

Comparative Examples II

In Comparative Examples II, when the nitriding was applied to the maraging steel, the organic chloride was not added to the nitrogen atmosphere and the nitriding was carried out for about 60 minutes. Remaining treating profiles were set to the same treating profiles as Examples.

(Results)

The results described in the following were obtained from the maraging steels in Examples, Comparative Examples I and Comparative Examples II. As shown in Table of FIG. 5, it was confirmed that all the maraging steels in Examples 1 to 4 have the extremely good fatigue life.

In contrast, the maraging steel in Comparative Example 1, in which the nitriding time was set shorter than Examples, and the maraging steel in Comparative Example 2, in which the nitriding time was set longer than Examples, did not have the sufficient fatigue life. Also, the maraging steel in Comparative Example 3, in which the aging executed before the nitriding was carried out short to get the hardness of below 500 Hv after the aging, did not have the sufficient fatigue life. In addition, the maraging steel in Comparative Example 4, in which the aging was carried out at the same time as the nitriding (the aging was carried out while executing the nitriding), provided the relatively high residual compressive stress, but it was found that the fatigue life is not so high. This reason, although not clearly analyzed, may be guessed such that the titanium on the grain boundary in the base material forms the deposit of the nitrogen to thus lower the grain boundary strength. Further, according to the maraging steel in Comparative Example 5, in which no nitriding was executed but merely the aging was executed, the residual compressive stress become low and the fatigue life had the smallest value.

Figure 6:
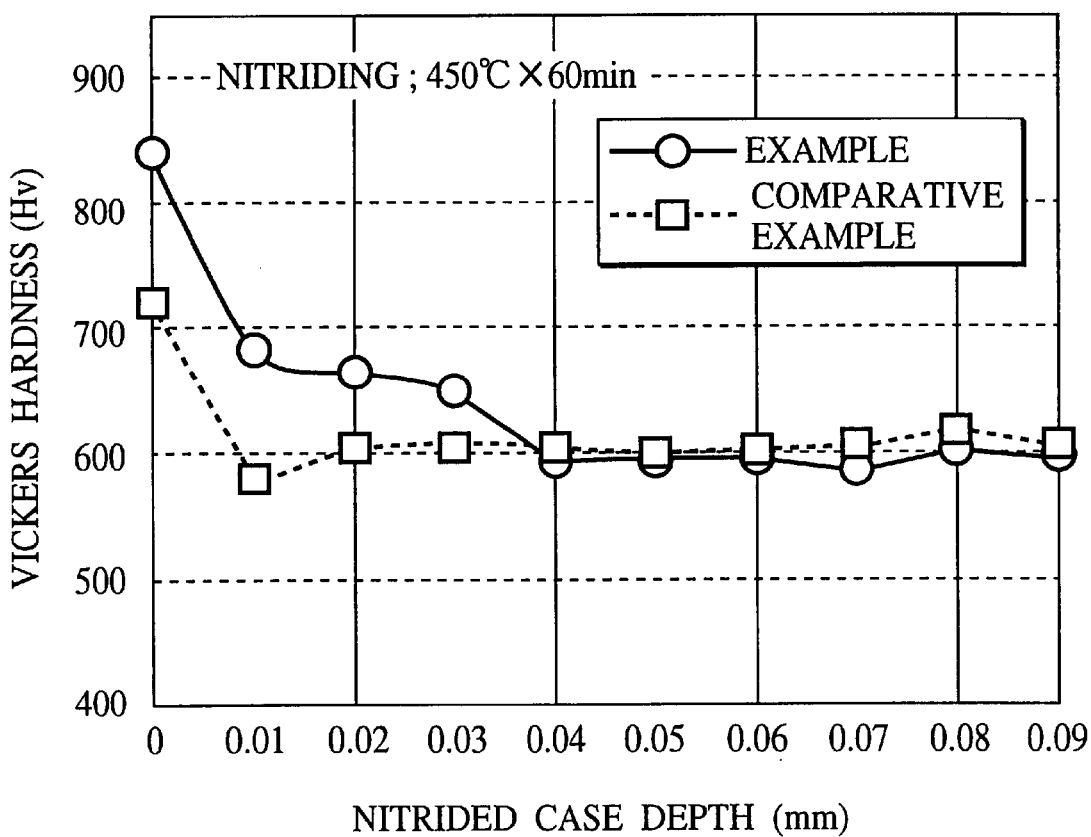
FIG. 6 is a graph showing the relationship between a nitrided case depth from a surface of the maraging steel, which is subjected to the nitriding, and Vickers hardness.

FIG. 6 shows measured result of the sectional hardness of the maraging steel in Example 4 of the present invention and the maraging steel in Comparative Examples II, which were subjected to the nitriding without the addition of methylene chloride. The Vickers hardness of the nitrided case is increased. Therefore, the nitrided case depth can be detected by measuring the Vickers hardness in the depth direction. In the case of Comparative Examples II, the depth in the area in which the hardness in the surface was increased by the nitriding, i.e., the nitrided case depth, was shallower than about 0.01 mm. Also, the Vickers hardness of the surface was merely around 700 Hv. In contrast, in the case of Example 1, the hardness of the surface was increased up to 839 Hv and the nitrided case depth reached a depth of 0.04 mm.

According to the results, it is understood that the addition of methylene chloride as the organic chloride in the nitriding has the effect to accelerate the nitriding reaction. The reason for this effect may be considered such that the added methylene chloride is vaporized in the furnace and then decomposed into the hydrogen chloride and the carbon, then the hydrogen chloride removes the passive oxide film on the maraging steel to activate the surface, and then the $NH_3$ gas in the atmospheric gas is adsorbed by the activated surface of the maraging steel, whereby the nitriding reaction is accelerated.

If the addition amount of methylene chloride is set below 30 ml per the furnace volume 1 $m^3$, the activation of the surface of the maraging steel is not sufficiently attained and thus the lack of the uniform nitriding or the omission of the nitriding was caused. In contrast, if the addition amount of methylene chloride exceeds 100 ml per the furnace volume 1 m, the free carbons were increased in the atmosphere and also the accumulation of the soot on the surfaces of the maraging steel and the inner wall of the furnace was increased. As a result, it was confirmed that the proper addition amount of methylene chloride is 30 to 100 ml per the furnace volume 1 $m^3$.

Figure 7:
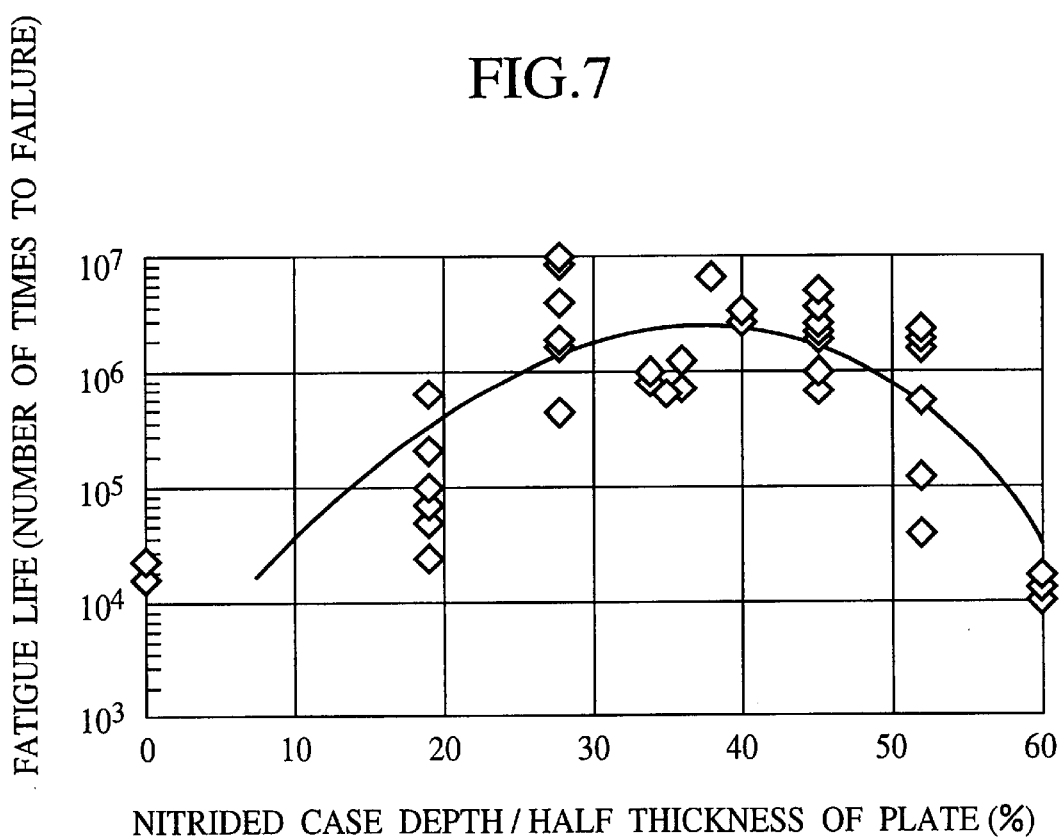
FIG. 7 is a graph showing the relationship between a rate of the nitrided case depth to a ½ plate thickness and a fatigue life.

FIG. 7 is a graph showing the relationship between a rate of the nitrided case depth to the plate thickness of the maraging steel and the fatigue life. Here, the maraging steel having the nitrided depth of 0% is not subjected to the nitriding. According to the results in this graph, it is seen that the good fatigue life can be obtained by the maraging steel whose nitrided case depth is set at a rate of 20% to 50%, preferably 25% to 45%, to a ½ plate thickness. When the nitrided case depth reached 60% to the ½ plate thickness, white fragile precipitation layer was formed on the surface of the maraging steel. This white fragile precipitation layer consisted of iron-nitrogen compound named compound layer. Thus, when this white fragile precipitation layer was formed, the fatigue life of the maraging steel was lowered.

Figure 8:
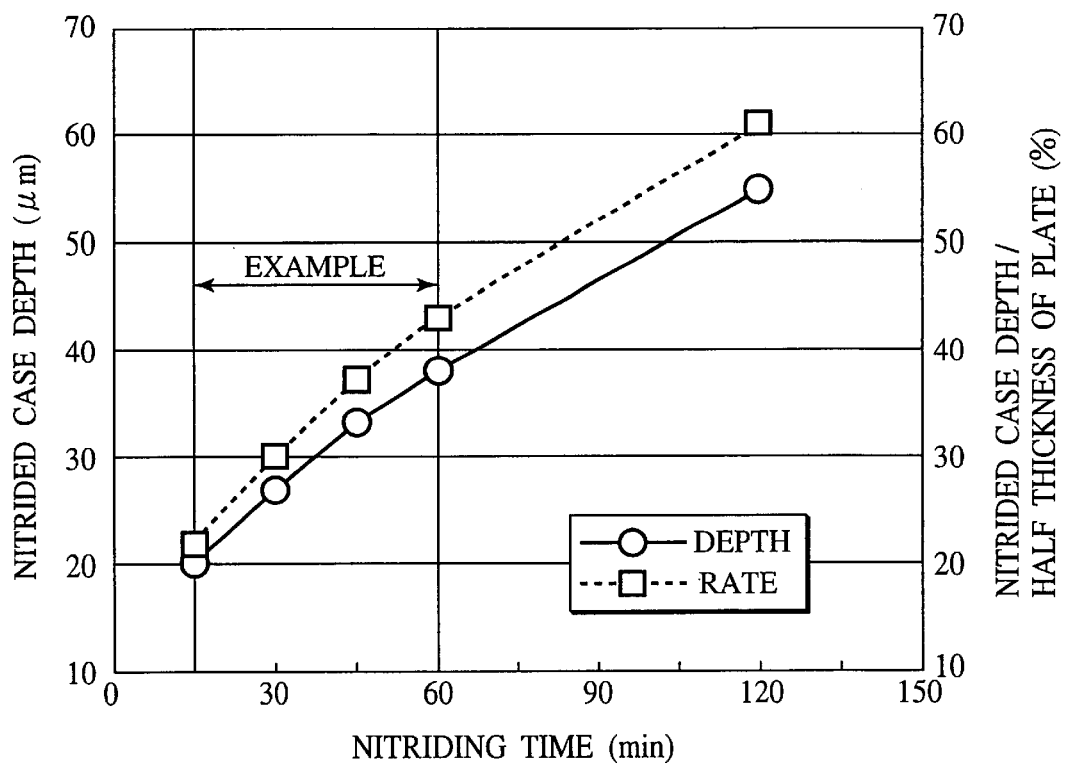
FIG. 8 is a graph showing the relationship between a nitriding time (uniform heat treatment time) and the nitrided case depth.

FIG. 8 is a graph showing the relationship between the nitriding time and the nitrided case depth, in the nitriding treating profiles of the maraging steel in Example. The nitrided case depth in the maraging steel is substantially proportional to the nitriding time. That is, it can be confirmed based on this graph that, if the nitriding treating profiles in the present embodiment are used, the nitrided case depth could be adjusted by the time precisely. Since the added methylene chloride removed the passive oxide film on the maraging steel in the nitriding method of the present embodiment, such methylene chloride suppressed the generation of variation in the nitriding reaction according to the location and thus contributed the formation of the uniform nitrided case. Therefore, the relationship between the nitriding time and the nitrided case depth could be adjusted.

Figure 9:
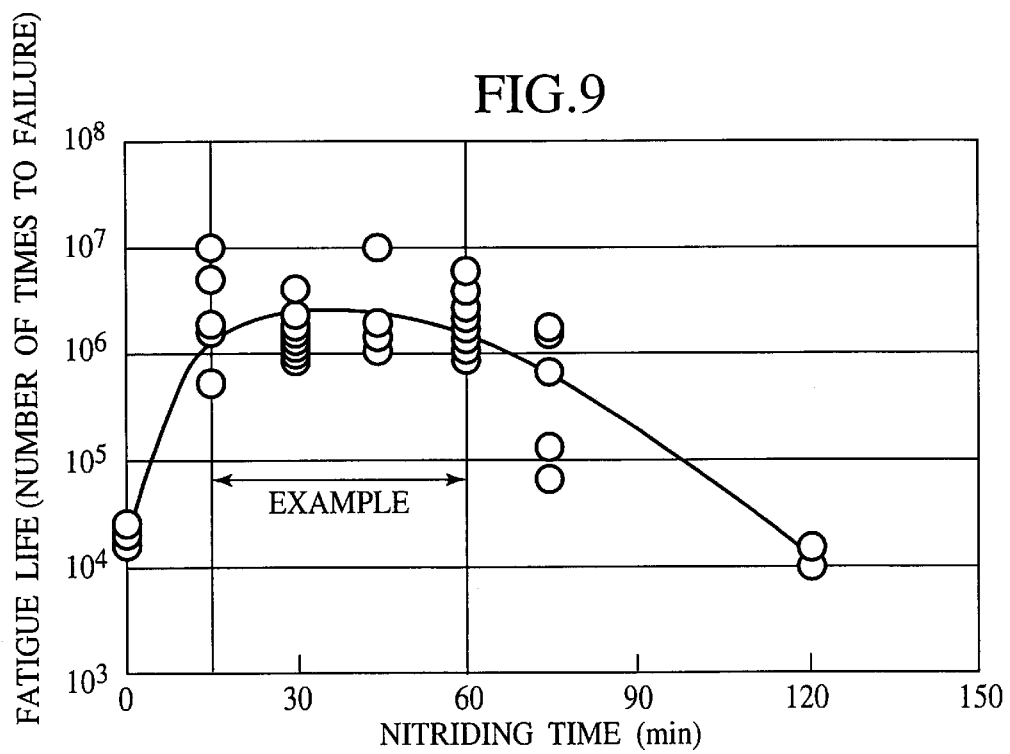
FIG. 9 is a graph showing the relationship between the nitriding time (uniform heat treatment time) and a number of revolution at a fatigue life (number of revolution up to breaking)

FIG. 9 is a graph showing the relationship between the nitriding time and the fatigue life, which is substituted for the relationship between the nitrided case depth and the fatigue life shown in FIG. 7. As evident from this graph, when the nitriding time was set to 15 to 60 minutes, the good fatigue life, i.e., the good fatigue life could be obtained. In other words, if the nitriding time is adjusted, the nitriding to provide the good fatigue life can be carried out not to measure the nitrided case depth.

Figure 10:
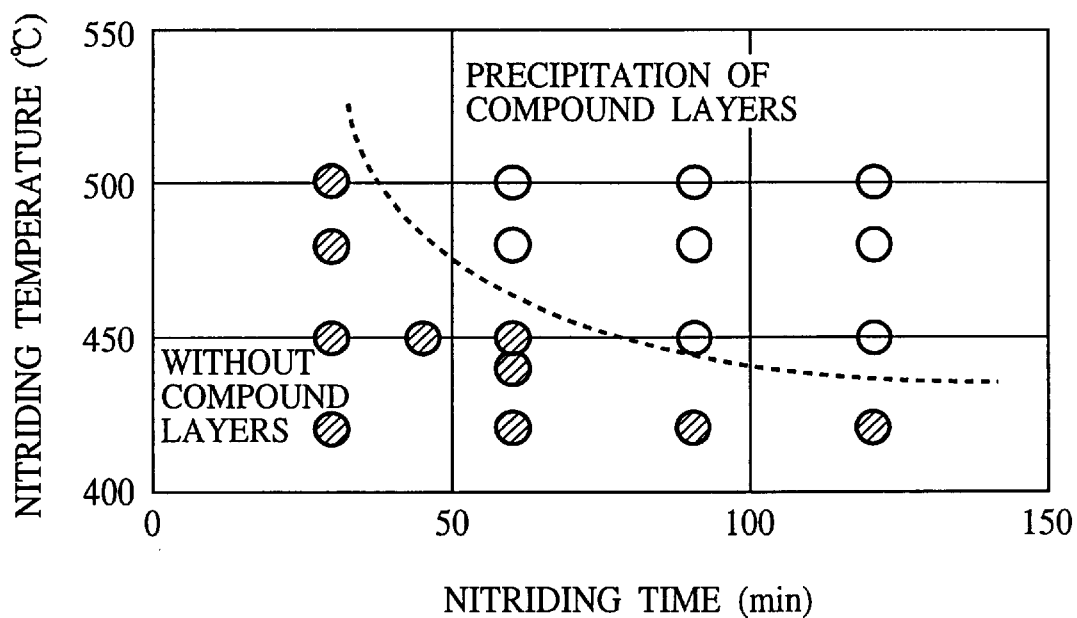
FIG. 10 is a graph showing the relationship between nitriding treating profiles (nitriding time and nitriding temperature) and compound layer precipitates.

FIG. 10 is a graph showing the compound layer forming conditions in the gas nitriding using the residual ammonia concentration of 40%. This graph is based on the above results that the fatigue life is lowered because of the formation of the compound layer. For example, it can be found that, if the treatment temperature is set to 450° C., the treatment time of more than 80 minutes should be avoided and, if the treatment temperature is set to 500° C., the treatment time of more than 50 minutes should be avoided. In this case, because this graph shows the results when the residual ammonia concentration is set to 40%, it should be noted that the compound layer forming area is shifted according to the ammonia concentration.

Figure 11:
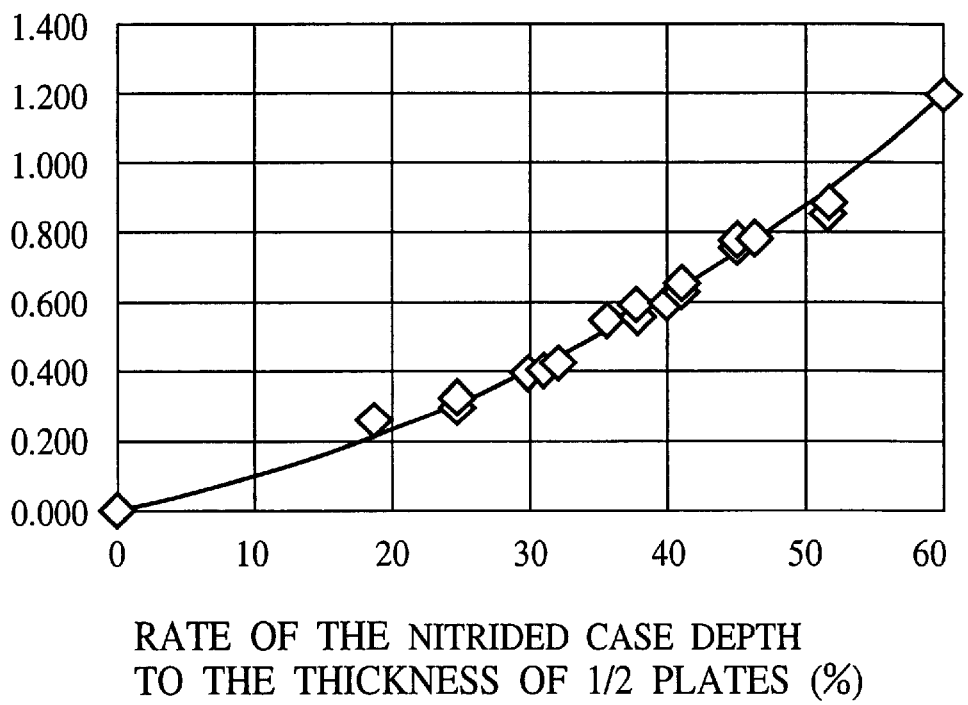
FIG. 11 is a graph showing the relationship between the ratio of the nitrided case depth to the ½ plate thickness and a change in a circumferential length after the nitriding.

FIG. 11 is a graph showing the relationship between the nitrided case depth and an amount of change in the circumferential length of the endless ring. If the nitrided case depth became deeper, the amount of change in the circumferential length of the endless ring was also increased, nevertheless a degree of variation in the circumferential length of the endless ring was small. In addition, the degree of variation is substantially constant irrespective of the nitrided case depth. Accordingly, it can be found that, if the nitriding method of the present embodiment is employed, the elongation of the nitrided case depth can be predicted based on the nitrided case depth and also the problem of the variation in the circumferential length of the endless ring is not caused.

As described above, according to the maraging steel of the present invention, since the tensile strength and the fatigue life are high, this maraging steel is suitable for the endless ring for the metal belt of the variable speed drive. Also, according to the nitriding treating profiles in the maraging steel manufacturing method of the present invention, not only the uniform nitrided case can be easily obtained but also the depth and the concentration of the nitrided case and the length of the maraging steel can be adjusted by managing the treatment time.

The entire contents of Japanese Patent Applications P2000-222209 (filed Jul. 24, 2000) and P2000-371107 (filed Dec. 6, 2000) are incorporated herein by reference.

Although the inventions have been described above by reference to certain embodiments of the inventions, the inventions are not limited to the embodiments described above. Modifications and variations of the embodiments described above will occur to those skilled in the art, in light of the above teachings.

In the examples of the present invention, the nitriding of the maraging steel is explained. But the above nitriding method may be applied as the nitriding for the high tensile structural steel such as the precipitation hardening stainless steel, for example, other than the maraging steel.

The scope of the invention is defined with reference to the following claims.

What is claimed is:

1. A method of manufacturing a maraging steel plate, comprising:

aging a maraging steel plate to have a hardness of more than 500 Hv; and forming a nitrided case whose depth is about 20% to 50% of a distance from a plate surface to a center by nitriding in a nitrogen atmosphere, to which organic chloride is added, after the aging.

2. The method according to claim 1, wherein the nitriding is carried out by executing a heat treatment at a temperature which is lower than a treating temperature of the aging and then holding the temperature constant for 15 to 60 minutes.

3. The method according to claim 1, wherein a treatment temperature in the nitriding is set to 450° C. to 500° C. and the treatment temperature is held constant for 15 to 60 minutes.

4. The method of claim 1, wherein the nitriding is a gas nitriding or a gas soft-nitriding employing an ammonia gas.

5. The method according to claim 1, wherein a treatment temperature and a time for the nitriding are set not to form a compound layer on a surface of the maraging steel plate.

6. The method according to claim 1, wherein the organic chloride is methylene chloride or vinylidene chloride.

7. The method according to claim 1, wherein methylene chloride is employed as the organic chloride, and the methylene chloride is added by 30 ml to 100 ml per 1 $m^3$ of furnace volume.

8. A method of manufacturing an endless ring applied to a metal belt, comprising:

aging a maraging steel plate to have a hardness of more than 500 Hv; and forming a nitrided case whose depth is about 20% to 50% of a distance from a plate surface to a center by nitriding in a nitrogen atmosphere, to which organic chloride is added, after the aging.

9. The method according to claim 8, wherein the nitriding is carried out by executing a heat treatment at a temperature which is lower than a temperature of the aging and then holding the temperature constant for 15 to 60 minutes.

10. The method according to claim 8, wherein a treatment temperature in the nitriding is set to 450° C. to 500° C. and the treatment temperature is held constant for 15 to 60 minutes.

11. The method of claim 8, wherein the nitriding is a gas nitriding or a gas soft-nitriding employing an ammonia gas.

12. The method according to claim 8, wherein a treatment temperature and a time for the nitriding are set not to form a compound layer on a surface of the maraging steel plate.

13. The method according to claim 8, wherein the organic chloride is methylene chloride or vinylidene chloride.

14. The method according to claim 8, wherein methylene chloride is employed as the organic chloride, and the methylene chloride is added by 30 ml to 100 ml per 1 $m^3$ of furnace volume.

* * * * *